US 6,718,129 B1

(12) United States Patent
Cornell

(10) Patent No.: US 6,718,129 B1
(45) Date of Patent: Apr. 6, 2004

(54) COMPACT CAMERA

(75) Inventor: David J. Cornell, Scottsville, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/417,973

(22) Filed: Apr. 17, 2003

(51) Int. Cl.[7] ............................................. G03B 17/02
(52) U.S. Cl. .......................... 396/6; 396/176; 396/535; 396/538
(58) Field of Search ........................... 396/6, 176, 348, 396/387, 411, 535, 538

(56) References Cited

U.S. PATENT DOCUMENTS

| 2,612,092 A | 9/1952 | Heyer et al. |
| 3,685,414 A | 8/1972 | Good |
| 4,455,074 A | 6/1984 | Wong et al. |
| 4,493,542 A | * 1/1985 | Ohmura et al. ............. 396/424 |
| 4,525,048 A | 6/1985 | Wong et al. |
| 4,601,562 A | 7/1986 | Yoneyama et al. |
| 5,692,221 A | * 11/1997 | Tobioka et al. ................ 396/6 |
| 6,176,625 B1 | 1/2001 | Ho |
| 6,325,555 B1 | 12/2001 | Zawodny et al. |

FOREIGN PATENT DOCUMENTS

JP          10-3142          1/1998

* cited by examiner

Primary Examiner—David M. Gray
(74) Attorney, Agent, or Firm—Roger A. Fields

(57) ABSTRACT

A compact camera comprises: a main body part having a front and a rear, including upper and lower longitudinally-horizontal partially-cylindrical portions defining rearwardly-open film chambers for a film supply spool and a film cartridge, and another portion between the upper and lower portions defining a rearwardly-open film exposing chamber between the film chambers, to allow a filmstrip to be advanced vertically across the film exposing chamber from one of the film chambers to the other film chamber; a flash circuit board on the front of the main body part, including a flash emission lens at the upper portion; and front and rear cover parts housing the main body part and flash circuit board.

7 Claims, 5 Drawing Sheets

COMPACT CAMERA

FIELD OF THE INVENTION

The invention relates generally to photography and in particular to compact or small size cameras.

BACKGROUND OF THE INVENTION

General

Film and cameras that are all in one, commonly referred to as single-use or one-time-use cameras, have become well known for their low cost and their compactness.

The one-time-use camera is a simple point-and-shoot camera comprising a conventional film cartridge within a cartridge receiving chamber in a main body part, an unexposed film roll prewound from the film cartridge onto a film supply spool within a film supply chamber in the main body part, a film-exposing chamber between the cartridge receiving and film supply chambers in the main body part, a fixed-focus taking lens, a manually rotatable film winding thumbwheel coaxially engaged with a film winding spool inside the film cartridge, a single-blade shutter, a manually depressible shutter release button, a frame counter wheel that has a scale of decreasing frame count numbers and is incrementally rotated to successively view each frame count number, an anti-backup pawl that engages the frame counter wheel to prevent its reverse rotation, a direct see-through viewfinder having front and rear viewfinder lenses, and in some models an electronic flash. A pair of separate front and rear cover parts house the main body part between them to complete the camera. The rear cover part connects to the main body part and/or to the front cover part to make the main body part light-tight. Front and rear cover labels (or a decorative cardboard outer box) at least partially cover the front and rear cover parts and have separate openings for the taking lens, the front and rear viewfinder lenses, etc.

To take a picture, the shutter release button is manually depressed. This causes a spring-urged high-energy lever to be released to strike the shutter blade, which then pivots open to uncover an exposure aperture. A return spring connected to the shutter blade pivots the shutter blade closed to re-cover the exposure aperture. Also, a metering lever is pivoted out of spring-biased engagement with the thumbwheel in order to permit manual rotation of the thumbwheel in the film winding direction after the picture is taken. When the thumbwheel is rotated in a film winding direction, it similarly rotates the film winding spool inside the film cartridge to wind an exposed frame of the filmstrip from across the exposure chamber to inside the film cartridge and to advance an unexposed frame of the filmstrip from the unexposed film roll to across the exposure chamber. The rewinding movement of the filmstrip the equivalent of slightly more than one frame width rotates a metering sprocket in engagement with successive perforations in the filmstrip, to in turn incrementally rotate the frame counter wheel to view its next lower frame count number. Also, the high energy lever is re-cocked or re-set and the metering lever is pivoted into re-engagement with the thumbwheel. When the metering lever re-engages the thumbwheel, further manual rotation of the thumbwheel in the film winding direction is prevented and the camera is ready to take another picture.

When the maximum number of frames available on the filmstrip have been exposed and the filmstrip is completely wound into the film cartridge, the one-time-use camera is given to a photofinisher who breaks away a cover door portion of the rear cover part from the main body part and removes the film cartridge with the exposed filmstrip from the cartridge receiving chamber. Then, he removes the exposed filmstrip from the film cartridge to develop the latent images and make prints for the customer.

Prior Art Problem

Most one time-use camera strive to be the model of compactness.

One example of a compact camera is disclosed in U.S. Pat. No. 4,601,562 issued Jul. 22, 1986. A camera body has upper and lower chambers for a film take-up spool and a film cartridge, and an exposure aperture between the chambers. The filmstrip is advanced vertically behind the exposure aperture from one of the chambers to the other chamber. This by itself is a compact arrangement. However, the compactness of the camera suffers by the location of an electronic flash unit. The electronic flash unit including its flash emission lens and capacitor are remotely spaced from the upper and lower chambers.

SUMMARY OF THE INVENTION

A compact camera comprises.

a main body part having a front and a rear, including upper and lower longitudinally-horizontal partially-cylindrical portions defining rearwardly-open film chambers for a film supply spool and a film cartridge, and another portion between the upper and lower portions defining a rearwardly-open film exposing chamber between the film chambers, to allow a filmstrip to be advanced vertically across the film exposing chamber from one of the film chambers to the other film chamber;

a flash circuit board on the front of the main body part, including a flash emission lens at the upper portion; and front and rear cover parts housing the main body part and flash circuit board.

Preferably, the front and rear cover parts are dimensioned so that the camera has a height H and a width W that are substantially the same, and a depth D from front to rear that is less than the height or width. Thus the front and rear cover parts are substantially square-faced.

DETAILED DESCRIPTION OF THE INVENTION

The invention is disclosed as being embodied preferably in a disposable one-time-use flash camera. Because the features of a one-time-use flash camera are generally known, the description which follows is directed in particular only to those elements forming part of or cooperating directly with the disclosed embodiment. It is to be understood, however, that other elements may take various forms known to a person of ordinary skill in the art.

Figure 1:
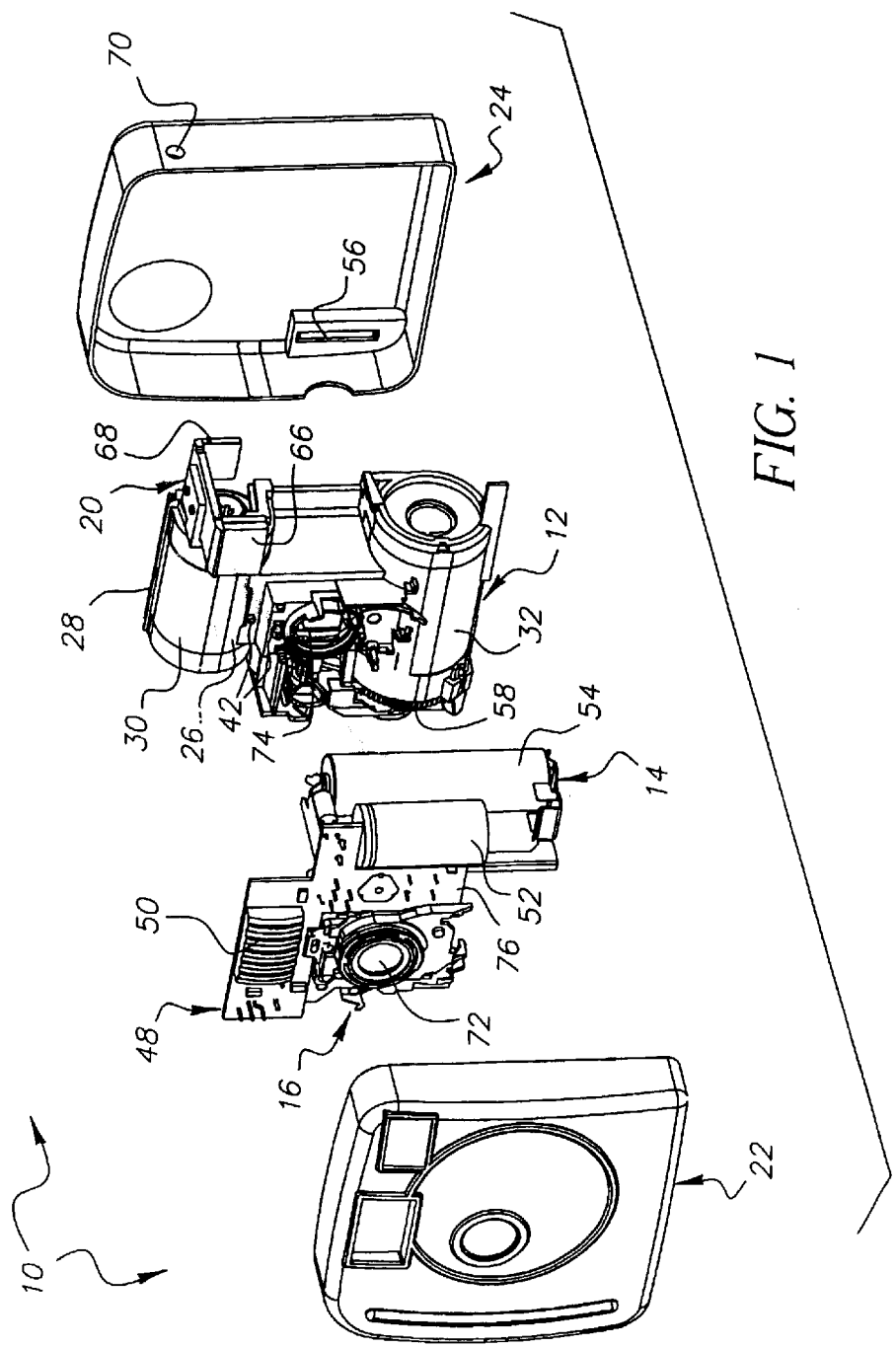
FIGS. 1 and 3 are exploded front perspective views of a compact one-time-use camera according to a preferred embodiment of the invention.
Figure 2:
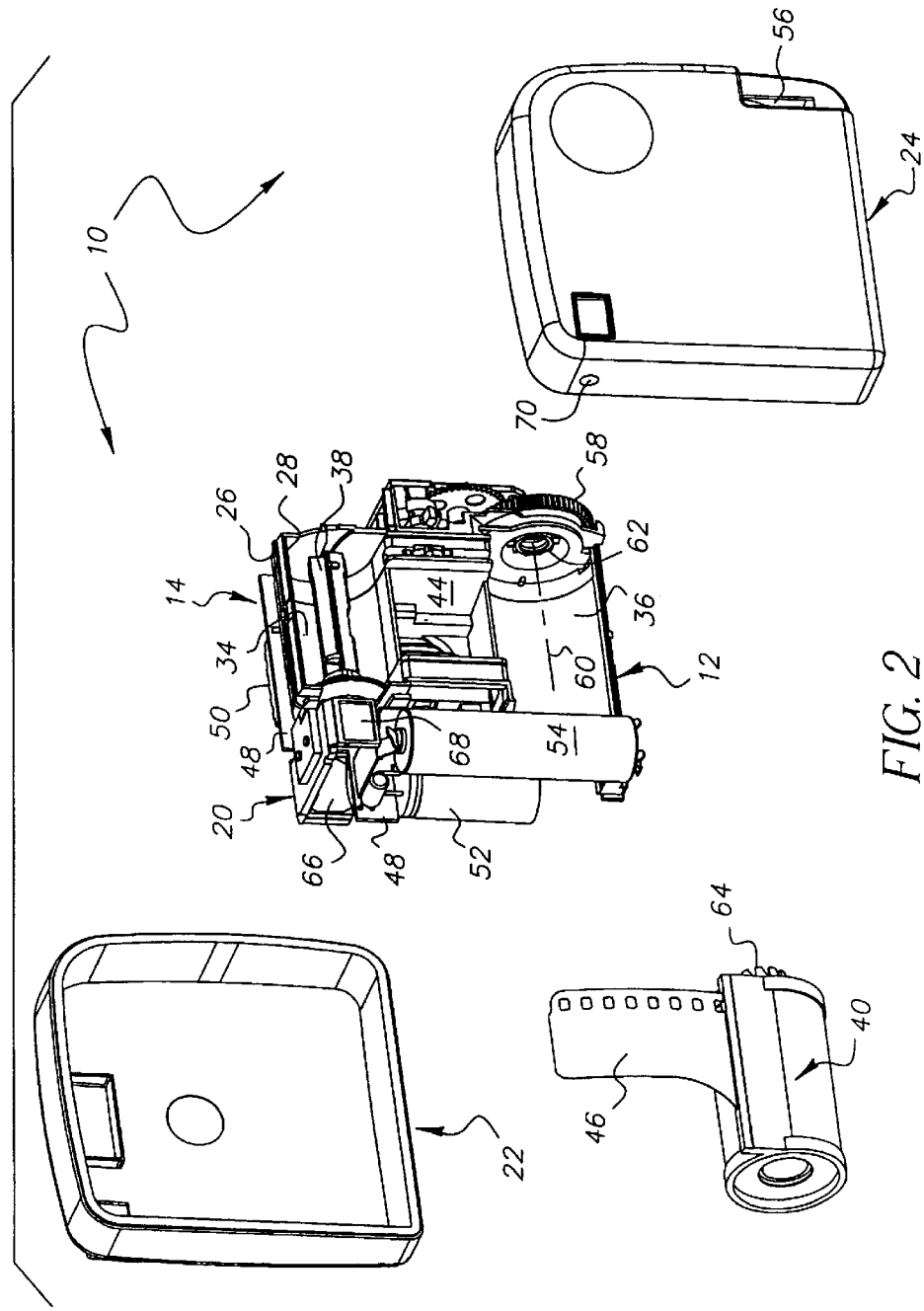
FIG. 2 is an exploded rear perspective view of the camera.
Figure 3:
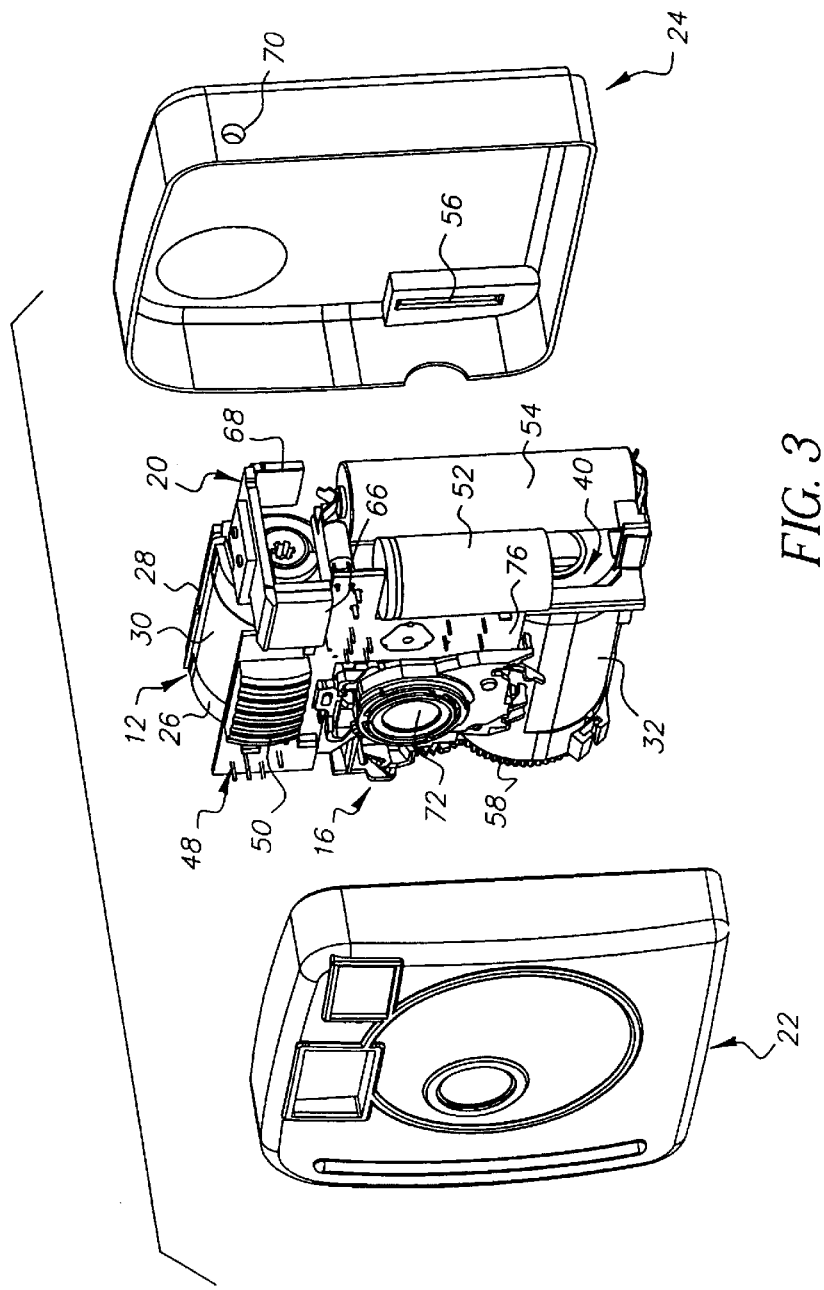

Referring now to the drawings, FIGS. 1–3 show a compact one-time-use flash camera 10 including an opaque main body part 12, an electronic flash unit 14, a lens-shutter unit 16, a viewfinder unit 20, an opaque front cover part 22, and an opaque exterior rear cover part 24. The electronic flash unit 14, the lens-shutter unit 16, and the viewfinder unit 20 are mounted on the main body part 12. The front cover part 22 and the rear cover part 24 house the main body part 12 (including the electronic flash unit 14, the lens-shutter unit 16, and the viewfinder unit 20) between them, and they are connected releasably to one another and to the main body part 12 via known-type hook-in-hole connections (not shown).

Figure 4:
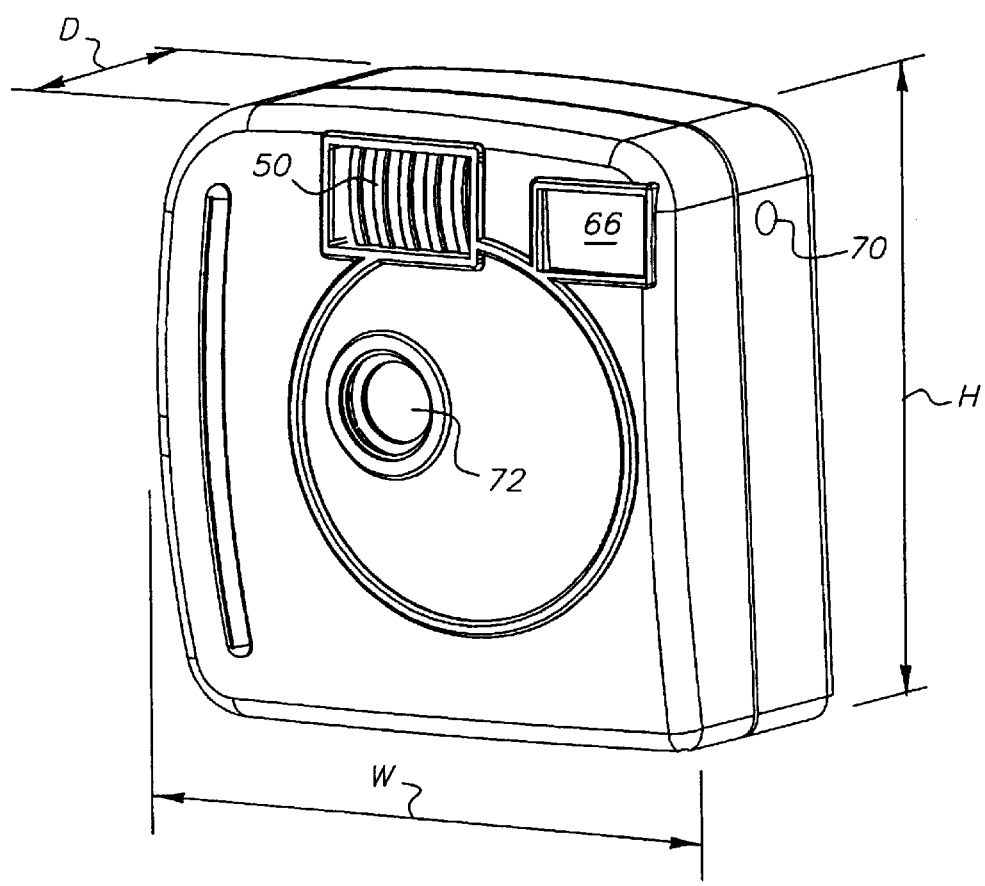
FIG. 4 is an assembled front perspective view of the camera.
Figure 5:
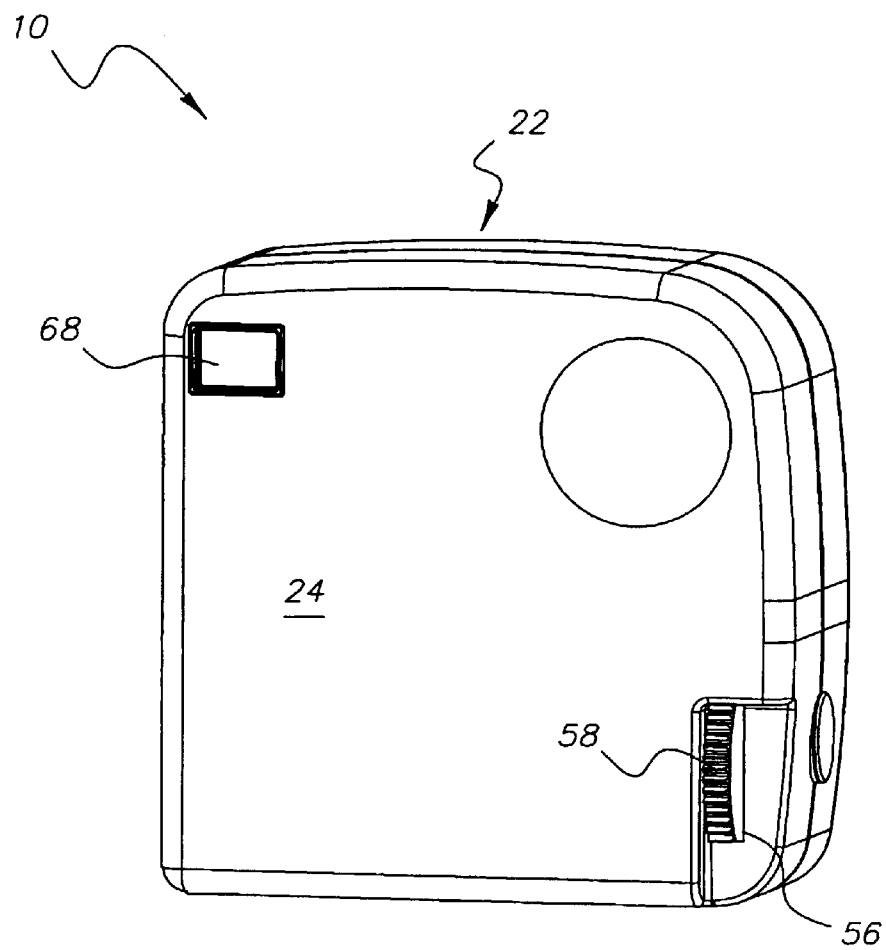
FIG. 5 is a rear elevation view of the camera.

The front and rear cover parts 22 and 24 are dimensioned so that the camera 10 has a height H and a width W that are substantially the same, and a depth D from front to rear that is less than the height or width. See FIG. 4. Thus the front and rear cover parts 22 and 24 are substantially square-faced.

The main body part 12 is a single-piece opaque construction having a front 26 and a rear 28. It includes upper and lower longitudinally-horizontal partially-cylindrical portions 30 and 32 defining rearwardly-open film chambers 34 and 36 for a film supply spool 38 and a 35 mm film cartridge 40, and another portion 42 between the upper and lower portions defining a rearwardly-open film exposing chamber 44 between the film chambers. A filmstrip 46 is to be advanced vertically across the film exposing chamber 44 from one of the film chambers 34 to the other film chamber 36. See FIGS. 1 and 2.

The electronic flash unit 14 includes a flash circuit board 48 mounted on the front 26 of the main body part 12, including a flash emission lens 50 at the upper partially-cylindrical portion 30 of the main body part. In other words, the film chamber 34 for the film supply spool 38 is behind the flash emission lens 50. See FIGS. 1–3. A parallel-spaced capacitor 52 and battery 54 are connected to the flash circuit board 48.

As shown in FIGS. 1–3 and 5, the rear cover part 24 has a lower vertical slot 56. A film winding thumbwheel 58 protrudes partially from the vertical slot 56 to be manually rotated, and it has a film winding axis 60 horizontally extending into the film chamber 36 for the film cartridge 40. See FIG. 2. The thumbwheel 58 has a toothed or serrated winding stem 62 that coaxially engages a protruding mating hub 64 of a film spool inside the film cartridge 40. When the thumbwheel 58 is manually clockwise in FIG. 2, the stem 62 similarly rotates the hub 64 to wind an exposed frame of the filmstrip 46 exposed at the film exposing chamber 44 into the cartridge 40 in the film chamber 36 and to advance a fresh frame of the filmstrip from the film supply spool 38 in the film chamber 34 to the film exposing chamber.

The viewfinder unit 20 is a single-piece transparent construction having parallel-spaced front and rear viewfinder lenses 66 and 68. See FIGS. 1–3. The space between the front and rear viewfinder lenses permits the film winding spool 38 in the film chamber 34 to be accessed through a pre-winding access opening 70 in the rear cover part 24, to factory pre-wind the filmstrip 46 (except for a trailing end) vertically across the film exposing chamber 44 onto the film supply spool from the film cartridge 40 in the film chamber 36. When pre-winding is completed, the opening 70 is plugged or covered to make it light-tight.

As shown in FIGS. 1–3, the battery 54 and flash capacitor 52 connected to the flash circuit board 48 are positioned erect directly beneath the viewfinder unit 20. The battery 54 and flash capacitor 52 extend adjacent one end of the film cartridge 40 as shown in FIG. 3.

The lens-shutter unit 16 including a fixed-focus taking lens 72 is mounted on the front 26 of the main body part 12, mostly at the portion 42 of the main body part between the upper and lower partially-cylindrical portions 30 and 32 of the main body part. See FIGS. 1 and 3. The taking lens 72 is positioned erect beneath the flash emission lens 50, and it is optically aligned with a fixed aperture 74 in the portion 42 of the main body part 12 (to allow the taking lens to focus an image of a subject being photographed at a rear film plane in the film exposing chamber 44).

A longitudinal portion 76 of the flash circuit board 48 is positioned erect, snugly between the taking lens 72 and the flash capacitor 52. See FIGS. 2 and 3.

The invention has been described in detail with particular reference to certain preferred embodiments thereof, but it will be understood that variations and modifications can be effected within the spirit and scope of the invention.

Parts List 10. one-time-use flash camera
12. main body part
14. electronic flash unit
16. lens-shutter unit
20. viewfinder unit
22. front cover part
24. rear cover part
H. height
W. width
D. depth
26. front
28. rear
30. upper portion
32. lower portion
34. film chamber
36. film chamber
38. film supply spool
40. film cartridge
42. other portion
44. film exposing chamber
46. filmstrip
48. flash circuit board
50. flash emission lens
52. capacitor
54. battery
56. slot
58. film winding thumbwheel
60. film winding axis
62. winding stem
64. spool hub
66. front viewfinder lens
68. rear viewfinder lens
70. pre-winding access opening
72. taking lens
74. aperture
76. longitudinal portion

What is claimed is:

1. A compact camera comprising:
   a main body part having a front and a rear, including upper and lower longitudinally-horizontal partially-cylindrical portions defining rearwardly-open film chambers for a film supply spool and a film cartridge, and another portion between said upper and lower portions defining a rearwardly-open film exposing chamber between said film chambers, to allow a filmstrip to be advanced vertically across said film exposing chamber from one of said film chambers to the other film chamber;
   a flash circuit board on the front of said main body part, including a flash emission lens at said upper portion;

front and rear cover parts housing said main body part and flash circuit board; and a taking lens on the front of said main body part positioned erect beneath said flash emission lens.

2. A compact camera as recited in claim 1, wherein said rear cover part has a vertical slot, and a film winding thumbwheel protrudes from said vertical slot to be manually rotated and has a film winding axis horizontally extending into one of said film chambers.

3. A compact camera comprising:

a main body part having a front and a rear, including upper and lower longitudinally-horizontal partially-cylindrical portions defining rearwardly-open film chambers for a film supply spool and a film cartridge, and another portion between said upper and lower portions defining a rearwardly-open film exposing chamber between said film chambers, to allow a filmstrip to be advanced vertically across said film exposing chamber from one of said film chambers to the other film chamber;

front and rear cover parts housing said main body part and flash circuit board; and a single-piece viewfinder unit having parallel-spaced front and rear viewfinder lenses between which one of said film chambers can be accessed through a pre-winding access opening in one of said front and rear cover parts to pre-wind a filmstrip vertically across said film exposing chamber into the accessed film chamber from the other film chamber.

4. A compact camera as recited in claim 3, wherein a battery and flash capacitor connected to said flash circuit board are positioned erect beneath said single-piece viewfinder.

5. A compact camera as recited in claim 3, wherein a taking lens on the front of said main body part is positioned erect beneath said flash emission lens.

6. A compact camera as recited in claim 5, wherein a longitudinal portion of said flash circuit board is positioned erect between said taking lens and said flash capacitor.

7. A compact camera as recited in claim 1, wherein said front and rear cover parts are dimensioned so that said compact camera has a height and width that are substantially the same and a depth from front to rear that is less than the height or width.

* * * * *